March 31, 1964 P. THIEME ET AL 3,126,621
MEANS FOR FRAMING FILM-TRANSPARENCIES
Filed May 10, 1961 5 Sheets-Sheet 1

INVENTORS:
PETER THIEME
WERNER SCHWARZ
BY Alfred W. Petchaft
ATTORNEY

March 31, 1964   P. THIEME ET AL   3,126,621
MEANS FOR FRAMING FILM-TRANSPARENCIES
Filed May 10, 1961   5 Sheets-Sheet 3

INVENTORS:
PETER THIEME
WERNER SCHWARZ
BY
ATTORNEY

INVENTORS:
PETER THIEME
WERNER SCHWARZ
BY
ATTORNEY

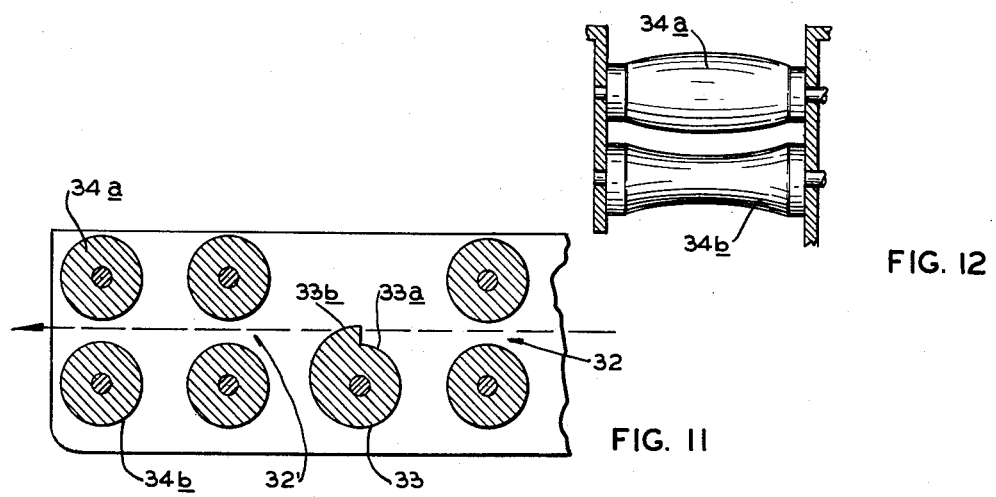
FIG. 12
FIG. 11
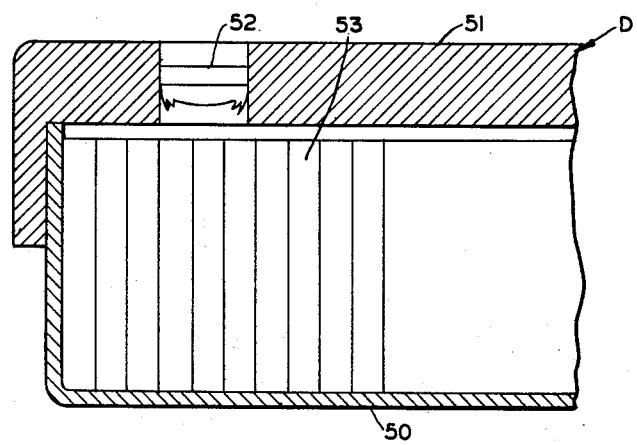
FIG. 16

United States Patent Office 3,126,621
Patented Mar. 31, 1964

3,126,621
MEANS FOR FRAMING FILM-TRANSPARENCIES
Peter Thieme and Werner Schwarz, both of Paderborn, Germany, assignors to Colorclip Photo oHG. Thieme u. Co., Paderborn, Germany, a corporation of Germany
Filed May 10, 1961, Ser. No. 109,056
14 Claims. (Cl. 29—211)

This invention relates in general to means for framing film-transparencies.

It is generally customary to enclose film-transparencies within a frame so that such transparencies can be readily inserted into a projector without damage. It is current practice to mount film-transparencies within a cardboard frame at the developing laboratory and return them to the customer in this condition, so that the transparencies will be ready for projection.

The use of cardboard frames, however, involves various disadvantages. For instance, when exposed to the rather intense heat of the projection apparatus, the film-transparencies, when enclosed within a cardboard frame, often cracked, since the cardboard frame is not able to withstand the stresses which develop in the film-transparencies when the latter is subjected to heat. Furthermore, it has been found that in automatic projection equipment the cardboard frames tend to warp and the margins become bent or twisted and, under such conditions, cardboard frames often become jammed within the guides or magazines and thereby cause the projection equipment to malfunction. Finally, the cardboard frames have the further disadvantage that it is virtually impossible to remove the film-transparency from the frame once it has been mounted therein, since the film-transparency is usually held in place by some sort of permanent adhesive.

The use of other more rigid materials for framing film-transparencies has, thus far, not been considered possible, inasmuch as no economical mechanical process has been developed for utilizing frames made of such modern materials.

It is, therefore, one of the primary objects of the present invention to provide a novel and unique film-transparency frame which is made of a synthetic resin or so-called plastic material which is simple in construction and suitable for assembly in an automatic film framing machine.

It is another object of the present invention to provide a film-transparency frame of the type stated which is unaffected by atmospheric conditions such as humidity and will not warp, curl, or become bent and thus prevent the automatic film framing machine from becoming jammed during assembly of the frame.

It is another object of the present invention to provide high-speed automatic means for cutting a roll of developed film into a series of successive film-transparencies and enclosing each of such film-transparencies in a frame constructed in accordance with the present invention.

It is another object of the present invention to provide an automatic mechanical framing device of the type stated which can be operated efficiently by unskilled employees without extensive training or special education.

It is a further object of the present invention to provide an automatic film-framing machine of the type stated which operates at high speeds and is capable of framing a large number of film-transparencies in successive order in a simple and efficient manner.

With the above and other objects in view, our invention resides in the novel features of form, construction, arrangement, and combination of parts presently described and pointed out in the claims.

In the accompanying drawings (five sheets)—

Figure 15:
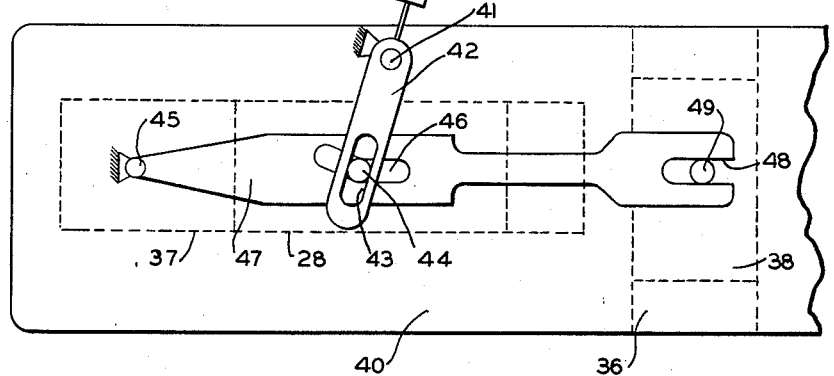
Figure 7:
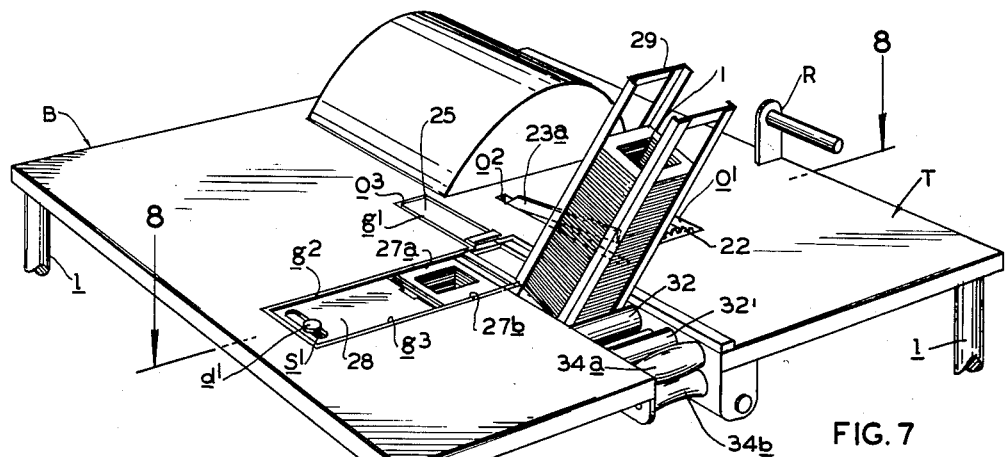
FIG. 7 is a fragmentary perspective view of a film-framing machine of the type schematically shown in FIG. 6.
Figure 8:
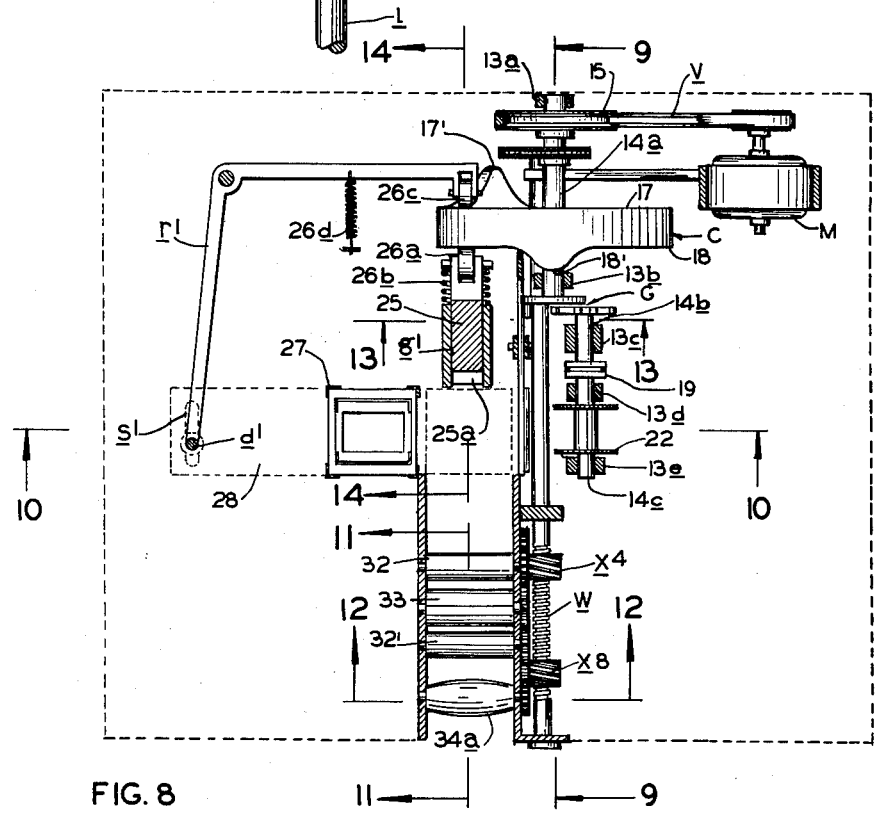
FIG. 8 is a horizontal sectional view taken along line 8—8 of FIG. 7.
Figure 9:
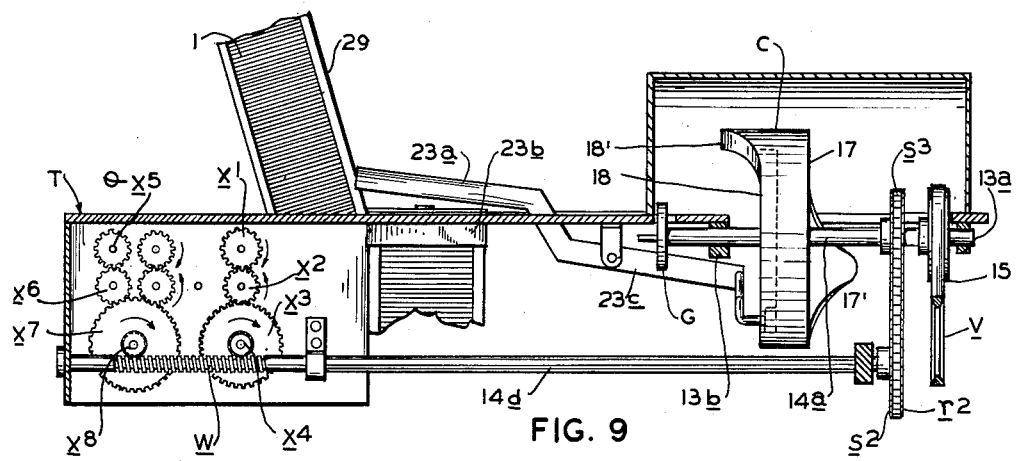
Figure 10:
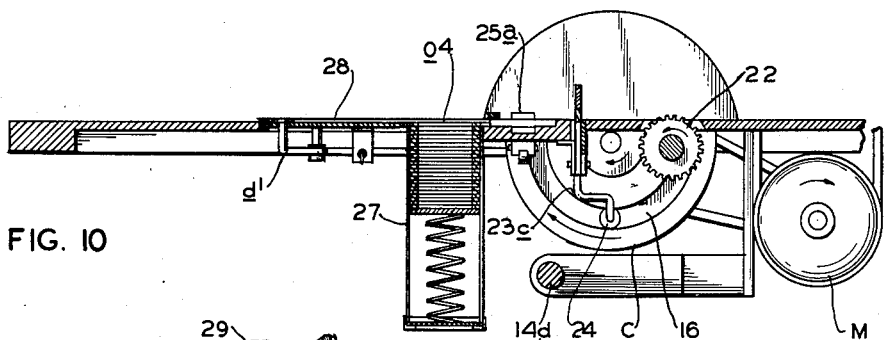
Figure 14:
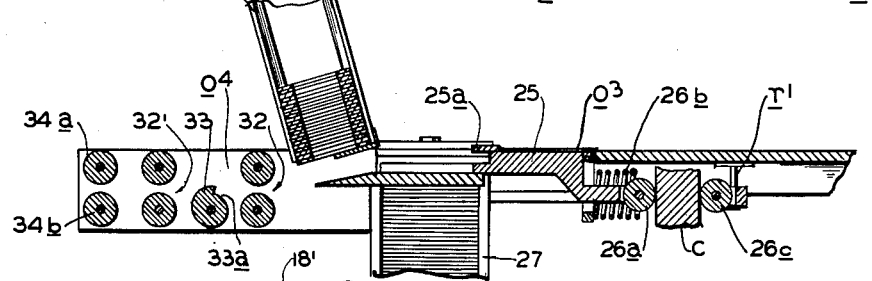
Figure 13:
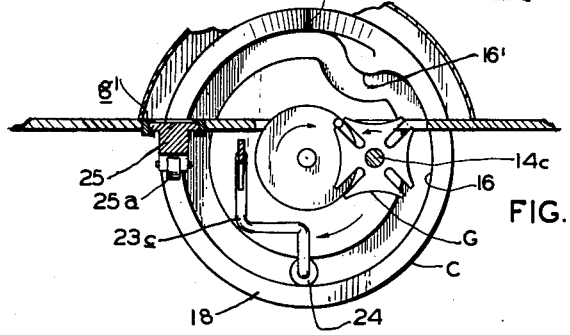

FIGS. 9, 10, 11, 12, 13, and 14 are fragmentary sectional views taken along lines 9—9, 10—10, 11—11, 12—12, 13—13, and 14—14, respectively, of FIG. 8;

FIG. 15 is a fragmentary vertical sectional view of a storage container constructed in accordance with and embodying the present invention; and FIG. 16 is a schematic illustration of a modified form of mechanical movement which may be utilized for advancing the retainer-member and film-transparency as a unit toward the position on which the retainer-member becomes engaged with the main frame.

Broadly speaking, the present invention resides in the development of a two-part film-transparency frame consisting of a main frame which provides a pocket or recess into which the film-transparency may be inserted, and a second frame component or retainer-member which can be interlocked or inter-engaged into the main frame so as to hold the film-transparency in marginally clamped position within the pocket. The main frame and retainer-member are both of such shape and design that they can be readily manufactured either by the injection molding or compression molding process from a synthetic resin or so-called "plastic" material, such as melamine, polystyrene, or a phenol-formaldehyde condensation product. In fact, it is possible to use any type of thermosetting resin which is temperature-resistant, will not warp under adverse atmospheric conditions, and is sufficiently flexible or "springy" so that the two components of the frame may be flexed somewhat and thereby "snapped" into inter-engaged position. Indeed, one of the advantages which is inherent in the use of a synthetic resin of the type stated is the fact that the two parts comprising the frame can be molded with such dimensional accuracy that the parts will fit together precisely and with complete interchangeability. Moreover, both the main frame and retainer-member can be relatively thin without impairing structural rigidity or any other desirable functional characteristic. In fact, film-transparency frames constructed in accordance with and embodying the present invention will ordinarily have a thickness ranging from 1.2 to 1.6 millimeters. The main frame is preferably provided with a plurality of recesses for slots adapted for receiving companion-shaped beveled projections or tongues formed around the margins of the retainer-member so that the latter may be inserted or retentively snapped into place therein. This insertion or interengagement can be accomplished by a momentary flexure of the two parts as they are brought together in the manner presently to be more fully described. Moreover, the main frame is provided with a film-retaining pocket defined by a plurality of internal ribs so that the film-transparency will be held in more or less precise marginal relationship within the viewing-opening or so-called "window" defined by the frame. The interior faces of the main frame and retainer-member which engage the marginal or peripheral portions of the film-transparency can, if desired, be provided with a rough-surfaced texture in order to engage the marginal portions of the film-transparency more securely. This can be accomplished either during the molding process by providing the internal face of the mold with a suitable pattern or can be accomplished subsequently by some mechanical abrading process, such as sand blasting or the like. It has also been found possible in connection with the present invention to design the two parts of the frame in such a manner that they are slightly arched toward each other when inter-engaged so that they fit tightly together and are urged toward each other with a certain amount of steady spring-like pressure, thereby firmly engaging the peripheral margins of the film-transparency which is framed therein. By this means the position of the film-transparency is retained against accidental or unauthorized slipping and, moreover, the film-transparency is held tightly within a substantially flat permanently established plane across the viewing opening or so-called "window" of the frame, thereby contributing materially to the sharpness of the picture which is projected from such film-transparency and, to a great extent, eliminating the necessity for continual refocusing of the projection lens as various framed transparencies are successively shifted into and out of position within the projector.

Also, by way of general outline, it may be noted that the automatic equipment for framing film-transparencies, in accordance with the present invention, broadly consists of means for advancing a roll of film by a stepwise movement in which each successive amount of movement is equivalent to the length of a single picture on the film. After each increment of advancing movement the film-strip is cut so that the picture is severed from the film-strip to form a separate film-transparency. Meanwhile, one of the retainer-members, constructed in accordance with the present invention, is fed into position so that the severed picture or film-transparency may be disposed in proper position upon the retainer-member. Thereupon, the retainer-member and film-transparency are fed, as a unit, along a horizontal plane, provided in a direction perpendicular to the initial direction of movement of the retainer-member, and the other frame component or so-called main frame is fed into overlying position upon the retainer-member and film-transparency disposed thereon. Upon further forward feeding movement the main frame and retainer-member are automatically flexed, preferably by means of suitably shaped rollers, and the beveled projections or tongues of the retainer-member are thereby caused to snap into engagement within the companion-shaped recesses or slots of the main frame. As the main frame and retainer element are fed through the rollers, they return to initial flat position in which they are firmly interlocked and the film-transparency is securely held in properly positioned relationship within the pocket therebetween. The fully assembled frame, with the film-transparency mounted therein, can then, if desired, be deposited within a suitable storage container, preferably of the type described and disclosed herein.

The storage container which is discussed herein and forms a part of the present invention, consists, broadly speaking, of a bottom member or receptacle-forming element which is of such size, shape, and dimension that a suitable number of framed film-transparencies can be stacked edgewise therein. Provided for cooperation with the bottom or receptacle-forming member is a cover or lid-forming member which is provided with a Fresnel lens located in such position that a frame containing a film-transparency can be slipped into the cover or lid behind the lens and held up to the light for viewing purposes.

Referring now in more detail and by reference characters to the drawings, which illustrate practical embodiments of the present invention, 1 designates a main frame molded from a suitable synthetic resin, either by injection molding or compression molding, and having a central rectangular view-opening, or so-called "window" 2, which is of substantially the same size and shape as the picture to be framed. The outwardly presented or front face $f^1$ of the main frame 1 is substantially flat and, if desired, can be provided with a rough-surfaced texture to facilitate handling and manual manipulation. This surface texture can, as previously noted, be formed during the molding process by providing a suitable pattern upon the interior face of the mold or can be subsequently formed by any suitable abrading process, such as sand blasting. Also, if desired, a selected area on the face $f^1$ can be left smooth so that a suitable descriptive legend can be written or otherwise suitably placed thereon to designate either the number of the picture, the title of the picture, the scene depicted, or some other pertinent information.

Around its periphery, the main frame 1 is provided with a relatively thick marginal border or flange 3 which defines a rectangular recess $r$. Opening into the recess $r$ along the perpendicular shoulder-like margins $m$ of the flange 3 and extending outwardly therethrough adjacent to the four corners of the recess $r$, are four slots $4^a$, each having an inclined or chamfered face $f^2$. Similarly opening into the recess $r$, midway of the lateral margins thereof, are slots $4^b$, preferably identical in size and shape to the slots $4^a$ and similarly having inclined or chamfered faces $f^3$.

Molded into and projecting upwardly from the bottom face 5 of the recess $r$ and extending in outwardly spaced, somewhat parallel, relation to the longitudinal margins of the view-opening 2 are narrow ribs 6, 6', which are integrally provided at their outer ends with laterally extending portions.

In this connection, it should be noted that the surface areas 7 between the opposite longitudinal margins of the view-opening 2 and the respective ribs 6, 6', may also be provided with a textured pattern applied during the molding process or may be subsequently formed by sand blasting or some other suitable mechanical method.

Provided for interfitting cooperation with the main frame 1 is a retainer-member or closure-plate 8 also molded from the same synthetic resin as the main frame 1 and being of such marginal size and thickness as to fit snugly and conformably within the recess $r$ so that its four margins are in close-lying relationship to the inwardly presented or shoulder-forming margins $m$ of the peripheral flange 3. Moreover, upon its two opposite longitudinal margins, the retainer-member 8 is integrally provided with four outwardly projecting beveled tongues $9^a$ which fit retentively within the slots $4^a$. Similarly, along its two opposite lateral margins, the retainer-member 8 is integrally provided with two outwardly projecting beveled tongues $9^b$ which are adapted for snug-fitting retentive engagement within the slots $4^b$ of the main frame 1. On its interior or inwardly presented face, the retainer-member 8 is provided with two shallow channels 10, 10', which are slightly larger than, and conform in shape to, the ribs 6, 6', so as to fit around and more or less enclosingly engage the ribs 6, 6', when the retainer-member 8 is inter-engaged with the main frame 1.

Figure 1:
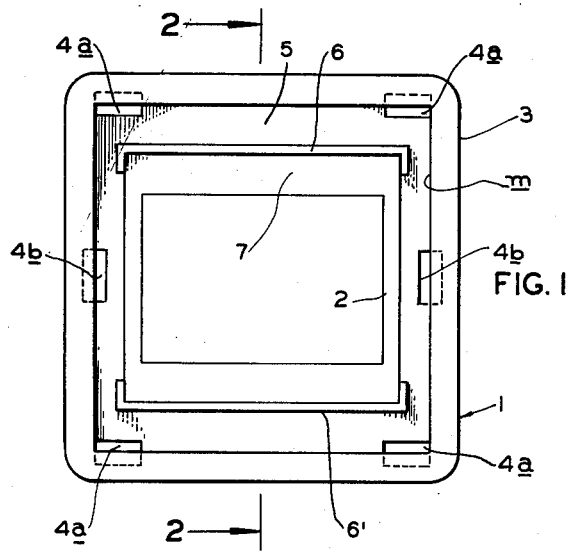
FIG. 1 is an elevational view of the main frame showing the pocket into which the film-transparency may be inserted.
Figure 2:
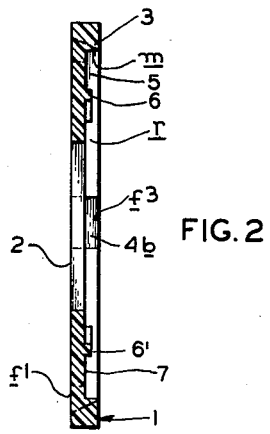
FIG. 2 is a sectional view taken along line 2—2 of FIG. 1.
Figure 3:
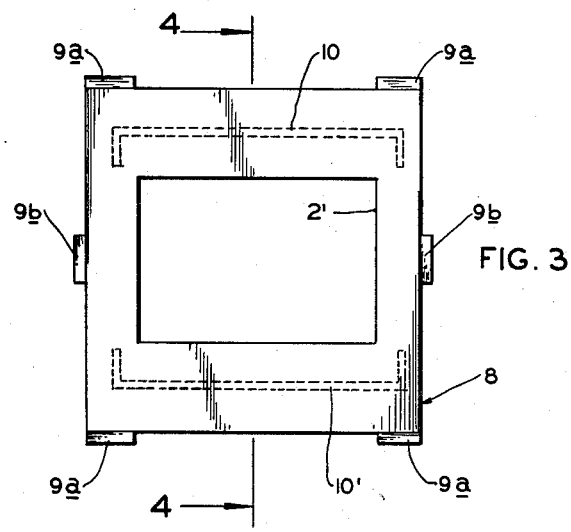
FIG. 3 is an elevational view of the retainer-member which is adapted for interlocked engagement with the main frame so as to hold the film-transparency in marginally clamped position within the film-retention pocket thereof.
Figure 4:
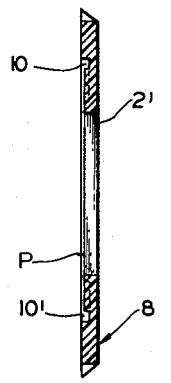
FIG. 4 is a sectional view taken along line 4—4 of FIG. 3.
Figure 5:
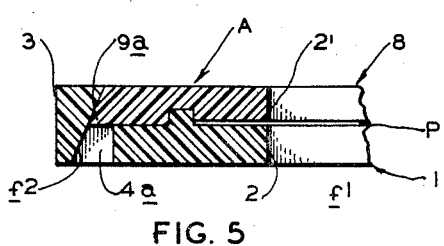
FIG. 5 is a fragmentary sectional view of the assembled film-transparency frame showing the manner in which the film is retentively held between the main frame and the retainer-member.
Figure 6:
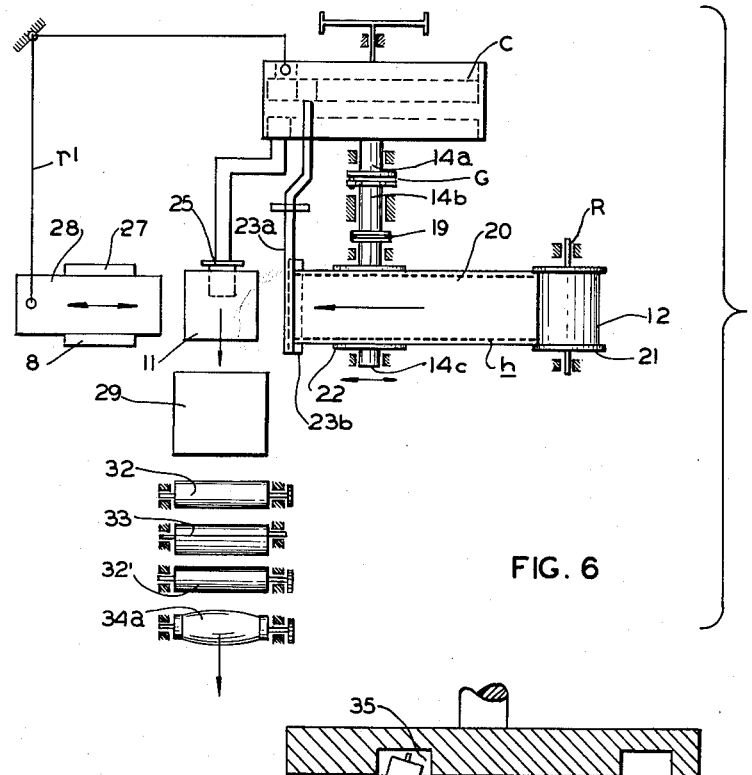
FIG. 6 is a schematic illustration of a film-framing machine constructed in accordance with and embodying the present invention.

The retainer-member 8 is also provided with a central view-opening 2' which is of such size, shape, and relative position as to be in precise marginal registration with the view-opening 2 of the main frame 1 when the retainer-member 8 and main frame 1 are in inter-engaged position. As will be seen by reference to FIG. 5, the peripheral portion of the retainer-member around the view-opening 2' is slightly reduced in thickness, so as to define a space or so-called pocket p which marginally conforms to the size of a film-transparency 11 to be disposed therein. It will, of course, be understood that the peripheral size of the pocket p is slightly larger than the exact dimensions of the film-transparency 11 to allow for slight variations and deviations which may occur in the film-manufacturing process or which may result from minor variations in dimensions of the film of different manufacturers. During the molding process, the retainer-member 8 is preferably curved inwardly to a slight degree so that the interior surface portions thereof which extend along the margins of the opening 2' will be slightly arched or bowed toward the film-transparency 11 when the latter is inserted within the pocket p. Consequently, when the retainer-member 8 and the main frame 1 are interengaged, the slightly arched portion of the retainer-member 8 will press against the film-transparency 11 with a limited degree of resiliency due to the inherent elasticity of the synthetic resin and, consequently, the marginal portions of the film-transparency 11 will be held securely within the pocket p by means of this slight pressure.

A preferred form of automatic machine B for framing film transparencies within the main frames 1 and retainer-members 8 is shown in FIGS. 6 to 14, and comprises a flat rectilinear horizontal table-top or base-plate T supported at its four corners by means of conventional legs l. Operatively mounted upon and extending in upwardly spaced relation over the table-top T adjacent one transverse margin thereof is a bracket-supported quill R which is adapted for rotatably supporting a roll of film 12 from which the separate film-transparencies 11 may be successively cut or severed.

Operatively supported at its opposite ends beneath the table-top T by means of journals $13^a$, $13^b$, is a main shaft $14^a$ provided at its rear end with a pulley 15 keyed or pinned thereon and driven by means of a V-belt v from a conventional electric motor M. Also keyed or otherwise rigidly attached to the shaft 14 is a cylindrical cam C having an internally cut cam groove 16 with a high-lobe 16' and edgewise presented cam-surfaces 17, 18, with high-lobes 17', 18', respectively. Similarly mounted upon the underside of the table-top T by means of journals $13^c$, $13^d$, $13^e$, are two axially aligned shafts $14^b$, $14^c$, which are interconnected by a conventional step-clutch 19. The forward end of the shaft $14^a$ is connected to the rear end of the shaft $14^b$ by means of a conventional Geneva movement or so-called "Maltese cross gearing," generally designated at G and adapted to rotate the shafts $14^b$, $14^c$, precisely through a predetermined fractional part of a revolution during each revolution of the shaft $14^a$.

As above noted, the roll of film 12 is mounted on the quill R and can be unreeled in the form of a straight film strip 20 from the film spool 21. As is well known, the film band 20 is conventionally provided with a marginal series of sprocket-holes h which fit over the teeth of a film-sprocket 22 which is mounted on the shaft $14^c$ and projects upwardly through a suitable aperture $o^1$ and above the table-top T. It will, of course, be evident that the Geneva movement G is designed so as to advance the film strip 20 in a stepwise manner by a lineal distance precisely equal to the height of a single film transparency 11 and the relative longitudinal position of the film strip 20 can be manually adjusted by means of the slip-clutch 19.

From the film-sprocket 22, the film strip 20 is fed between upper and lower scissor-blades $23^a$, $23^b$, the latter being stationary and projecting upwardly through an elongated slot-like opening $o^2$ so that its cutting edge lies directly below the horizontal plane of travel of the film strip 20. The upper blade $23^a$ is pivoted to the blade $23^b$ and is provided on its forward end with a cutting edge which normally extends diagonally upwardly with respect to the cutting edge of the stationary blade $23^b$. Thus, the film strip 20 passes freely therebetween during the feeding cycles of the Geneva movement G. At its rearward end, the cutting blade $23^a$ extends downwardly beneath the table-top T and is provided with a laterally offset arm $23^c$ which projects in the cam-groove 16. Rotatably mounted on the rear end of the arm $23^c$ is a cam-following roller 24 which rides operatively upon the surface of the cam-groove 16. The high-lobe 16' is positioned or "timed" so that it will cause the blade $23^a$ to swing down during each dwell period of the Geneva movement G so that a single film-transparency 11 will be cut off precisely along the dividing line between itself and the next succeeding picture-containing portion of the film strip 20.

Formed in the table-top T, and extending along the front-to-rear center-line, is a second slot-like opening $o^3$ provided adjacent its rear end with a horizontally disposed slide-guide $g^1$ for operatively supporting a reciprocating feed-plunger 25 which is, in turn, provided at its rear end with a cam-following roller $26^a$ that rides upon the cam-surface 18, the feed-plunger 25 being biased rearwardly by a spring $26^b$ so that it will be shifted forwardly when the roller $26^a$ rides up on the high-lobe 18'. Moreover, it should be noted that this shifting movement occurs during a dwell period in the Geneva movement G. At its forwardly presented end, the feed-plunger 25 is provided with a pair of vertical tongues $25^a$ which are spaced by a distance approximately equal to the combined thickness of the retainer-member 8 and the film-transparency 11 so as to grip them snugly and position them relatively to each other as well as within the plane and direction of conveying movement after the film-transparency 11 has been cut off and the retainer-member 8 placed in position beneath it.

A suitable number of retainer-members 8 are stacked in horizontal position, one upon the other in a magazine 27 which is mounted on the underside of, and extends downwardly from the table-top T at the inner end of a transversely extending slot-like opening $o^4$. The stack of retainer-members 8 is biased upwardly against the upper stop-flanges $27^a$, $27^b$ by a conventional spring-urged element which is commonly used in this type of upwardly-feeding magazine-structure and, therefore, is not shown specifically or described in detail herein. It is merely sufficient for present purposes to note that the uppermost retainer-member is held in horizontal alignment with the space between the tongues $25^a$ and the magazine 27 is open on its sides directly beneath the stop-flanges $27^a$, $27^b$, so that the retainer-member 8 may be pushed laterally out of the magazine 27 by means of a flat reciprocating slide 28 which is marginally supported in horizontal slide-guides $g^2$, $g^3$. Adjacent to its outer end, the slide 28 is provided with a transverse slot $s^1$ which operatively engages a driving-pin $d^1$ carried in the end of a bell-crank or rock-arm $r^1$ pivoted on the underside of the table-top T. At its other end, the rock-arm $r^1$ is provided with a cam-following roller $26^c$ which is biased against the cam-surface 17 by means of a spring $26^d$ so that the high-lobe 17' will shift the slide 28 laterally across and through the top of the magazine 27 to eject the uppermost retainer-member 8 and position it between the tongues $25^a$ with its inner or film-contacting face presented upwardly so that the film-transparency 11 will drop or "settle," so to speak, in properly located relationship thereon as it is cut off. As the cam C continues its rotation, the slide 28 will return to initial position and the next succeeding retainer-member 8 will be pushed upwardly into position for ejection during the next cycle of operation. It will, of course, be evident that the high-lobe 17' is located on the cam C in such position that the retainer-member 8 is ejected from the magazine during a dwell period of the Geneva movement G.

Mounted upon the upper face of the table-top T is a magazine 29 for receiving and holding a suitable number of main frames 1 in stacked relation with the open side of the pocket p facing downwardly. The magazine 29 is, furthermore, so positioned (e.g., by being forwardly inclined) that the lowermost main-frame 1 is inclined to the path or plane movement of the retainer-member 8 with one of the pairs of slots $4^a$ presented for receiving the oncoming tongues $9^a$ of the retainer-member 8 as it is fed forwardly by the reciprocating feed-plunger 25 along a line perpendicular to the initial path along which the retainer-member 8 is ejected from the magazine 27. As the retainer-member 8 is advanced by the feed-plunger 25, the tongues $9^a$ will seat in the slots $4^a$ of the lowermost main frame 1 and withdraw the latter from the magazine 29 into overlying relationship upon the retainer-member 8. As the main frame 1 is withdrawn from the magazine 29, it is brought together with the retainer-member 8, thereby enclosing the film-transparency 11 within the pocket $p$ forming a partially closed frame assembly A which, up to this point in the cycle, is being gripped and advanced by the tongues $25^a$ of the feed-plunger 25. As the feed-plunger 25 reaches the forward limit of its stroke, the forwardly presented edge of the main frame 1 is pushed between a pair of parallel rubber-covered feed rollers 32 which extend transversely across the opening $o^4$ a short distance forwardly of the magazine 29 above and below the path or plane of movement of the frame assembly A. The rollers 32 are provided with intermeshing spur gears $x^1$, $x^2$, the latter being in turn, driven by a spur gear $x^3$ which is, in turn, provided with an axially projecting helical gear $x^4$ that is driven from a worm $w$ mounted on the forward end of a shaft $14^d$ journaled beneath the table-top T and provided at its rear end with a sprocket $s^2$ connected by a roller-chain $r^2$ to a driving sprocket $s^3$ mounted on shaft $14^a$. Thus, when the frame assembly A is caught between the rollers 32 it is pulled forwardly away from the tongues $25^a$ and fed forwardly through the space between the rollers 32.

Also operatively mounted transversely across the slot-like opening $o^4$ is a freely rotating rubber-surfaced roller 33 which has the cross-sectional shape of a spiral cam with a low surface-portion $33^a$ and a high surface-portion $33^b$. The low surface-portion $33^a$ is substantially tangent to the path or plane of travel of the frame assembly A. Mounted transversely across the slot-like opening $o^4$ forwardly of the roller 33 is a second pair of feed rollers $32'$ identical in all respects to the previously described rollers 32 and likewise driven from the worm $w$. Finally, a pair of feed rollers $34^a$, $34^b$, are similarly mounted across the opening $o^4$ respectively above and below the path or plane of movement of the frame assembly A. The roller $34^a$ is axially convex and the roller $34^b$ is complementarily concave and are driven by intermeshing spur gears $x^5$, $x^6$, the latter being, in turn, driven by a spur gear $x^7$ which is provided with an axially projecting helical gear $x^8$ also in mesh with the worm $w$. The rollers 32 will grip and feed the frame assembly A forwardly as it leaves the rollers 32. Since the roller 33 is located between rollers 32 and the rollers $32'$, the downwardly presented side of the frame assembly A will frictionally engage the low surface-portion $33^a$ and cause the roller 33 to rotate upon its axis as the frame assembly passes over it. During the course of this rotation, the roller 33 will progressively flex the frame assembly A upwardly across its rear margin and cause the rear set of tongues $9^a$ to slip into the rear pair of slots $4^a$. Then, as the frame assembly A is fed forwardly by the roller $32'$ and passes between the rollers $34^a$, $34^b$, it is flexed transversely so that the sidewardly presented tongues $9^b$ slip into the slots $4^b$ thereby completely interlocking the retainer-member 8 and the main frame 1 with the film-transparency 11 securely held in place across the registering view-openings 2, $2'$.

If desired, it is possible to employ a modified form of ejector slide driving mechanism operated from a single cam-groove 35, as shown in FIG. 15, which may be used instead of separate timing cam-surfaces 17, 18, on the cam C. This mechanism comprises two horizontal slide-guides 36, 37, which are perpendicular to each other for supporting an ejector slide 28 substantially as described in the previous embodiment and a second slide 38 which is employed in lieu of the feed-plunger 25. Mounted on the upper side of the base-plate 40 is a stationary pivot-pin 41 for rockably supporting an actuating lever 42 which is operatively connected at one end by a suitable intermediate mechanism to the cam-groove 35. Formed in the other end of the lever 42 is a straight slot 43 which shiftably engages a pin 44 mounted in and projecting from the ejector slide 28. Also mounted on the base-plate 40 is a pivot pin 45. Rockably mounted at one end thereon is a lever 47 having a dog-leg slot 46 which also engages the pin 44 on the ejector slide 28. At its other end, the lever 47 is provided with a bifurcated clevis 48 which operatively engages a pin 49 mounted in the slide 38.

In operation, the lever 42 of this modified form of driving mechanism is oscillated by the cam-groove 35 and the ejector slide 28 is reciprocated by the pin 44 to eject the uppermost retainer-member 8 from the magazine 27. On its return movement, the lever 42 shifts the ejector slide 28 back to initial position and in so doing, causes the pin 44 to move into the angular portion of the dog-leg slot 46 thereby rocking the lever 47 and shifting the slide 38 forwardly to feed the retainer-member 8 and the film-transparency 11 forwardly as a unit toward the magazine 29.

After the frame assemblies A have been filed with film-transparencies 11 and suitably interlocked, the pictures may be intended for use in large numbers, which are to be shown, for example, at a public meeting by the use of projection equipment. In such case, the frame assemblies A may be loaded into a conventional projector-magazine having slide-grooves by which the frame assemblies A are supported in spaced parallel relation, described herein.

If, however, the frame assemblies A are to be used in small numbers, for example, as a group of pictures taken during a summer vacation trip, then each individual picture will probably be viewed separately by a small circle of viewers without projection apparatus. In such case, it has been found convenient to provide a novel storage container D, constructed in accordance with the present invention as shown in FIG. 16. This storage container D comprises a box-like bottom portion or receptacle 50 and a lid 51 which fits down marginally around the rim of the receptacle 50. Both the receptacle 50 and lid 51 may, if desired, be manufactured from a transparent synthetic resin by a suitable molding process. Molded or otherwise suitably formed in the lid 51 is a Fresnel lens 52 having a focal length corresponding to the depth of the rim of the lid 51. It is thereby possible to view the framed film-transparencies by removing the lid 51 and holding it up to the light. The film-transparencies can then be placed one at a time in the lid behind the Fresnel lens 52 which will then magnify the picture on the film-transparency. By this means the need for a separate magnifier is obviated. It should also be noted in this connection that the surfaces of the Fresnel lens 52 are recessed in to the lid 51 by a sufficient distance so as to protect such surfaces from being scratched by the proximate edges of frame assemblies 53 disposed in upright position within the box-like receptacle 50 as shown in FIG. 16.

It should be understood that changes and modifications in the form, construction, arrangement, and combination of the several parts of the means for framing film-transparencies may be made and substituted for those herein shown and described without departing from the nature and principle of our invention.

Having thus described our invention, what we claim and desire to secure by Letters Patent is:

1. A machine for framing film-transparencies in a two-part frame having a main frame provided with a pocket and a retainer-member adapted to fit within the pocket and interlock with the main frame whereby to hold the film-transparency in the pocket; said machine comprising a first magazine for holding a supply of retainer-members, a second magazine for holding a supply of main frames, means for holding a supply of film-transparencies, means for feeding a retainer-member from the first magazine, means for placing a single film-transparency upon the retainer-member, means for feeding the retainer-member and film-transparency as a unit along a predetermined path, means for removing a main frame from the second magazine in overlying relation upon the retainer-member and film-transparency, assembling means including a pair of juxtaposed rollers operatively mounted in relation to each other for gripping an overlying retainer-member and main frame and transporting them as a unit along said predetermined path, said rollers respectively having interfitting surface shapes adapted to produce flexure of the retainer-member and main frame as they are transported along said path while at the same maintaining them in said overlying position and thereby interlocking the retainer-member with the main frame, and a base-forming means for supporting all of the aforementioned means in cooperative relationship.

2. A machine for framing film-transparencies in a two-part frame having a normally flat resilient main frame provided with a pocket and a normally flat resilient retainer-member adapted to fit within the pocket and interlock with the main frame whereby to hold the film-transparency in the pocket; said machine comprising a first magazine for holding a supply of retainer-members, a second magazine for holding a supply of main frames, means for holding a supply of film-transparencies, means for feeding a retainer-member from the first magazine, means for placing a single film-transparency upon the retainer-member, means for feeding the retainer-member and film-transparency as a unit along a predetermined path, means for removing a main frame from the second magazine in overlying relation upon the retainer-member and film-transparency, assembling means including a pair of juxtaposed rollers operatively mounted in relation to each other for gripping an overlying retainer-member and main frame and transporting them as a unit along said predetermined path, said rollers respectively having interfitting surface shapes adapted to produce flexure of the retainer-member and main frame while at the same time maintaining them in said overlying position as said retainer-member and main frame are being transported between said rollers whereby to cause interlocking of the retainer-member with the main frame as they pass beyond said rollers and flex back to their normally flat position, and a base-forming means for supporting all of the aforementioned means in cooperative relationship.

3. A machine for framing film-transparencies in a two-part frame having a main frame provided with a pocket and a retainer-member adapted to fit within the pocket and interlock with the main frame whereby to hold the film-transparency in the pocket; said machine comprising a first magazine for holding a supply of retainer-members, a second magazine for holding a supply of main frames, means for holding a supply of film-transparencies, slide means for feeding a retainer-member from the first magazine, means for placing a single film-transparency upon the retainer-member, means for feeding the retainer-member and film-transparency as a unit along a predetermined path, means for removing a main frame from the second magazine in overlying relation upon the retainer-member and film-transparency, assembling means including a concave roller and a complementarily shaped convex roller operatively mounted in relation to each other for gripping an overlying retainer-member and main frame and transporting them as a unit along said predetermined path whereby to flex the retainer-member and main frame as they are transported along said path while holding them in said overlying position and thereby interlocking the retainer-member with the main frame, and a base-forming means for supporting all of the aforementioned means in cooperative relationship.

4. A machine for framing film-transparencies in a two-part frame having a main frame provided with a pocket and a retainer-member adapted to fit within the pocket and interlock with the main frame whereby to hold the film-transparency in the pocket; said machine comprising a first magazine for holding a supply of retainer-members, a second magazine for holding a supply of main frames, means for holding a supply of film-transparencies, means for feeding a retainer-member from the first magazine, means for placing a single film-transparency upon the retainer-member, plunger-like means for feeding the retainer-member and film-transparency as a unit along a predetermined path, means for removing a main frame from the second magazine in overlying relation upon the retainer-member and film-transparency, assembling means including a concave roller and a complementarily shaped convex roller operatively mounted in relation to each other for gripping an overlying retainer-member and main frame and transporting them as a unit along said predetermined path whereby to flex the retainer-member and main frame as they are transported along said path while holding them in said overlying position and thereby interlocking the retainer-member with the main frame, and a base-forming means for supporting all of the aforementioned means in cooperative relationship.

5. A machine for framing film-transparencies in a two-part frame having a main frame provided with a pocket and a retainer-member adapted to fit within the pocket and interlock with the main frame whereby to hold the film-transparency in the pocket; said machine comprising a first magazine for holding a supply of retainer-members, a second magazine for holding a supply of main frames, means for holding a supply of film-transparencies, slide means for feeding a retainer-member from the first magazine, means for placing a single film-transparency upon the retainer-member, plunger-like means for feeding the retainer-member and film-transparency as a unit along a predetermined path, means for removing a main frame from the second magazine in overlying relation upon the retainer-member and film-transparency, assembling means including a concave roller and a complementarily shaped convex roller operatively mounted in relation to each other for gripping an overlying retainer-member and main frame and transporting them as a unit along said predetermined path whereby to flex the retainer-member and main frame as they are transported along said path while holding them in said overlying position and thereby interlocking the retainer-member with the main frame, and a base-forming means for supporting all of the aforementioned means in cooperative relationship.

6. A machine for framing film-transparencies in a two-part frame having a main frame provided with a pocket and a retainer-member adapted to fit within the pocket and interlock with the main frame whereby to hold the film-transparency in the pocket; said machine comprising a first magazine for holding a supply of retainer members, a second magazine for holding a supply of main frames, means for holding a supply of film-transparencies, means for feeding a retainer-member from the first magazine, means for placing a single film-transparency upon the retainer-member, means for feeding the retainer-member and film-transparency as a unit along a predetermined path, means for removing a main frame from the second magazine in overlying relation upon the retainer-member and film-transparency, assembling means including a concave roller and a complementarily shaped convex roller operatively mounted in relation to each other for gripping an overlying retainer-member and main frame and transporting them as a unit along said predetermined path whereby to flex the retainer-member and main frame while holding them in said overlying position and thereby interlocking the retainer-member with the main frame, and a base-forming means for supporting all of the aforementioned means in cooperative relationship.

7. A machine for framing film-transparencies in a two-part frame having a main frame provided with a pocket and a retainer-member adapted to fit within the pocket and interlock the main frame whereby to hold the film-transparency in the pocket; said machine comprising a first magazine for holding a supply of retainer-members, a second magazine for holding a supply of main frames, means for holding a supply of film-transparencies, means for feeding a retainer-member from the first magazine, means for placing a single film-transparency upon the retainer-member, means for feeding the retainer-member and film-transparency as a unit along a predetermined path, means for removing a main frame from the second magazine in overlying relation upon the retainer-member and film-transparency, assembling means including non-cylindrical rollers and a pair of juxtaposed rollers, said rollers respectively having interfitting surface shapes adapted to produce flexure of the retainer-member and main frame while at the same time maintaining said retainer-member and main frame in said overlying position and thereby interlocking the retainer-member with the main frame, and a base-forming means for supporting all of the aforementioned means in cooperative relationship.

8. A machine for framing film-transparencies in a two-part frame having a normally flat resilient main frame provided with a pocket and a normally flat resilient retainer-member adapted to fit within the pocket and interlock with the main frame whereby to hold the film-transparency in the pocket; said machine comprising a first magazine for holding a supply of retainer-members, a second magazine for holding a supply of main frames, means for holding a supply of film-transparencies, means for feeding a retainer-member from the first magazine, means for placing a single film-transparency upon the retainer-member, means for feeding the retainer-member and film-transparency as a unit along a predetermined path, said second magazine being located along said predetermined path and inclined thereto so that a main-frame will be held in the path of said unit so that the advancing edge of the retainer-member in such unit will fit into the pocket of said main frame and engage a margin of such pocket whereby, upon continued movement along said predetermined path, to pull a main frame from the second magazine in overlying relation upon the retainer-member and film-transparency, assembling means including a pair of juxtaposed rollers operatively mounted in relation to each other for gripping an overlying retainer-member and main frame and transporting them as a unit along said predetermined path, said rollers respectively having interfitting surface shapes adapted to produce flexure of the retainer-member and main frame while said retainer-member and main frame are being transported between said rollers whereby to cause interlocking of the retainer-member with the main frame, said rollers being adapted to release said retainer-member and main frame as they pass beyond said rollers thereby permitting them to flex back to their normally flat position and interlock one with the other, and a base-forming means for supporting all of the aforementioned means in cooperative relationship.

9. A machine for framing film-transparencies in a two-part frame having a main frame provided with a pocket and a retainer-member adapted to fit within the pocket and interlock with the main frame whereby to hold the film-transparency in the pocket; said machine comprising a first magazine for holding a supply of retainer-members, a second magazine for holding a supply of main frames, means for holding a supply of film-transparencies, means for feeding a retainer-member from the first magazine, means for placing a single film-transparency upon the retainer-member, means for feeding the retainer-member and film-transparency as a unit along a predetermined path, said second magazine being located along said predetermined path and inclined thereto so that a main frame will be held in the path of said unit so that the advancing edge of the retainer-member in such unit will fit into the pocket of said main frame and engage a margin of such pocket whereby, upon continued movement along said predetermined path, to pull a main frame from the second magazine in overlying relation upon the retainer-member and film-transparency, assembling means including a concave roller and a complementarily shaped convex roller operatively mounted in relation to each other for gripping an overlying retainer-member and main frame and transporting them as a unit along said predetermined path whereby to flex the retainer-member and main frame as they are transported along said path while holding them in said overlying position and thereby interlocking the retainer-member with the main frame, and a base-forming means for supporting all of the aforementioned means in cooperative relationship.

10. A machine for framing film-transparencies in a two-part frame having a main frame provided with a pocket and a retainer-member adapted to fit within the pocket and interlock with the main frame whereby to hold the film-transparency in the pocket; said machine comprising a first magazine for holding a supply of retainer-members, a second magazine for holding a supply of main frames, means for holding a supply of film-transparencies, means for feeding a retainer-member from the first magazine, means for placing a single film-transparency upon the retainer-member, means for feeding the retainer-member and film-transparency as a unit along a predetermined path, said second magazine being located along said predetermined path and inclined thereto so that a main frame will be held in the path of said unit so that the advancing edge of the retainer-member in such unit will fit into the pocket of said main frame and engage a margin of such pocket whereby, upon continued movement along said predetermined path, to pull a main frame from the second magazine in overlying relation upon the retainer-member and film-transparency, assembling means having complementarily shaped interfitting rollers operatively mounted in relation to each other for gripping an overlying retainer-member and main frame and transporting them as a unit along said predetermined path whereby to flex the retainer-member and main frame as they are transported along said path while holding them in said overlying position and thereby interlocking the retainer-member with the main frame, and a base-forming means for supporting all of the aforementioned means in cooperative relationship.

11. A machine for framing film-transparencies in a two-part frame having a normally flat resilient main frame provided with a pocket and a normally flat resilient retainer-member adapted to fit within the pocket and interlock with the main frame whereby to hold the film-transparency in the pocket; said machine comprising a first magazine for holding a supply of retainer-members, a second magazine for holding a supply of main frames, means for holding a supply of film-transparencies, means for feeding a retainer-member from the first magazine, means for placing a single film-transparency upon the retainer-member, means for feeding the retainer-member and film-transparency as a unit along a predetermined path, means for removing a main frame from the second magazine in overlying relation upon the retainer-member and film-transparency, assembling means for interconnecting a set consisting of a retainer-member and main frame disposed in said overlying position, said assembling means including a first roller having a spiral cross-sectional shape for engaging and transporting said set along said predetermined path, a pair of elements located on opposite sides of, and operatively associated with, said first roller for engaging marginal portions of the set as it passes along said path, portions of the surfaces of said elements being so located as to cause said set to flex about an axis transverse to said path of movement as it passes across said first roller, a pair of juxtaposed rollers operatively mounted in relation to each other for gripping an overlying retainer-member and main frame and transporting them as a unit along said predetermined path, said rollers respectively having interfitting surface shapes adapted to produce flexure of the retainer-member and main frame as they are transported along said path while at the same time maintaining said retainer-member and main frame in said overlying position as said retainer-member and main frame are being transported between said rollers whereby to cause interlocking of the retainer-member with the main frame, said rollers being adapted to release said retainer-member and main frame as they pass beyond said rollers thereby permitting them to flex back to their normally flat position and interlock one with the other, and a base-forming means for supporting all of the aforementioned means in cooperative relationship.

12. A machine for framing film-transparencies in a two-part frame having a main frame provided with a pocket and a retainer-member adapted to fit within the pocket and interlock with the main frame whereby to hold the film-transparency in the pocket; said machine comprising a first magazine for holding a supply of retainer-members, a second magazine for holding a supply of main frames, means for holding a supply of film-transparencies, means for feeding a retainer-member from the first magazine, means for placing a single film-transparency upon the retainer-member, means for feeding the retainer-member and film-transparency as a unit along a predetermined path, means for removing a main frame from the second magazine in overlying relation upon the retainer-member and film-transparency, means consisting of a concave roller and complementarily shaped convex roller for flexing the retainer-member and main frame while holding them in said overlying position and thereby interlocking the retainer-member with the main frame, and a base-forming means for supporting all of the aforementioned means in cooperative relationship.

13. A machine for framing film-transparencies in a two-part frame having a main frame provided with a pocket and a retainer-member adapted to fit within the pocket and interlock with the main frame whereby to hold the film-transparency in the pocket; said machine comprising a first magazine for holding a supply of retainer-members, a second magazine for holding a supply of main frames, means for holding a supply of film-transparencies, means for feeding a retainer-member from the first magazine, means for placing a single film-transparency upon the retainer-member, means for feeding the retainer-member and film-transparency as a unit along a predetermined path, means for removing a main frame from the second magazine and placing it in overlying relation upon the retainer-member and film-transparency to form a set, means for initially flexing the set in one direction, said means including a roller having a spiral cross-sectional shape for engaging said set as it moves along said path and two pairs of juxtaposed rollers located on opposite sides of the spiral roller in such a manner as to cause the set to flex as it is contacted by the portions of the spiral roller having increasingly greater radial dimension, a third pair of juxtaposed rollers consisting of one convex roller and a complementarily shaped concave roller operatively mounted in relation to each other for gripping an overlying retainer-member and main frame and transporting them as a unit along said predetermined path whereby to flex the retainer-member and the main frame as they are transported along said path while holding them in said overlying position and thereby interlocking the retainer-member with the main frame, and a base-forming means for supporting all of the aforementioned means in cooperative relationship.

14. A machine according to claim 13 in which the pairs of juxtaposed rollers are driven in timed relation and the spiral roller is turned by frictional engagement with the set as it passes thereover.

References Cited in the file of this patent

UNITED STATES PATENTS

| | | |
|---|---|---|
| 2,516,687 | Eckstein | July 25, 1950 |
| 2,692,424 | Habel | Oct. 26, 1954 |
| 2,697,889 | Heim | Dec. 28, 1954 |
| 2,806,309 | Goldberg | Sept. 17, 1957 |
| 2,966,739 | Kalbow | Jan. 3, 1961 |
| 2,986,809 | Focht | June 6, 1961 |